(12) United States Patent
Zhang et al.

(10) Patent No.: US 10,030,962 B2
(45) Date of Patent: Jul. 24, 2018

(54) PRECISION-POSITIONING DRIVE PRE-TIGHTENING DEVICE

(71) Applicant: South China University of Technology, Guangdong (CN)

(72) Inventors: Xianmin Zhang, Guangdong (CN); Ruizhou Wang, Guangdong (CN)

(73) Assignee: South China University of Technology, Guangzhou, Guangdong Province (CN)

( * ) Notice: Subject to any disclaimer, the term of this patent is extended or adjusted under 35 U.S.C. 154(b) by 101 days.

(21) Appl. No.: 15/320,505

(22) PCT Filed: Dec. 5, 2014

(86) PCT No.: PCT/CN2014/093090
§ 371 (c)(1),
(2) Date: Dec. 20, 2016

(87) PCT Pub. No.: WO2015/196741
PCT Pub. Date: Dec. 30, 2015

(65) Prior Publication Data
US 2017/0160068 A1    Jun. 8, 2017

(30) Foreign Application Priority Data

Jun. 27, 2014  (CN) .......................... 2014 1 0301047

(51) Int. Cl.
*G01B 7/00* (2006.01)
*G01B 7/02* (2006.01)
(Continued)

(52) U.S. Cl.
CPC ................ *G01B 7/023* (2013.01); *F16B 2/16* (2013.01); *G01B 3/38* (2013.01); *G01B 5/24* (2013.01)

(58) Field of Classification Search
CPC .. G01B 3/38; G01B 5/24; G01B 7/023; F16B 2/16
(Continued)

(56) References Cited

U.S. PATENT DOCUMENTS 5,029,483 A    7/1991  Gautschi et al.
9,971,357 B2 *  5/2018  Zhang ...................... G05D 3/12
(Continued)

FOREIGN PATENT DOCUMENTS

CN    1416314 A    5/2003
CN    102619821 A    8/2012
(Continued)

OTHER PUBLICATIONS

PCT/CN2014/093090 International Search Report, dated Mar. 24, 2015.

*Primary Examiner* — Yaritza Guadalupe-McCall
(74) *Attorney, Agent, or Firm* — Hahn Loeser & Parks, LLP

(57) ABSTRACT

Disclosed is a precision-positioning drive end pre-tightening device, which comprises a positioning platform (6), an actuator (14), a capacitive sensor (4), a capacitive sensor bracket (3), a pre-tightening block (12) and a film force sensor (13), wherein a sliding groove is provided in the middle of the positioning platform (6), and said pre-tightening block (12), said film force sensor (13) and said actuator (14) are provided in the sliding groove in sequence; the capacitive sensor bracket (3) is fixed on the positioning platform (6), and three connecting rods (3-1) which are connected in sequence via compliant hinges are axially provided at one end of the bracket body of the capacitive sensor bracket (3); an end surface of the capacitive sensor (4) and an upper side surface of the pre-tightening block (12) are parallel to each other, and a gap exists therebetween; and a two-stage pre-tightening device for pre-tightening the
(Continued)

pre-tightening block (12) are also provided on the positioning platform (6). The technical means of the device is simple and easy, and the device can satisfy the requirements in related fields of precision positioning, precision and ultra-precision machining, precision operating, precision measurement, micro-electro-mechanical system, etc. for the precision-locating drive end pre-tightening device.

5 Claims, 3 Drawing Sheets

(51) Int. Cl.
  *F16B 2/16* (2006.01)
  *G01B 5/24* (2006.01)
  *G01B 3/38* (2006.01)
(58) Field of Classification Search
  USPC .................................................. 33/613, 645
  See application file for complete search history.

(56) References Cited

U.S. PATENT DOCUMENTS

| 2017/0160068 A1* | 6/2017 | Zhang | G01B 7/023 |
| 2018/0081376 A1* | 3/2018 | Zhang | G05D 3/12 |

FOREIGN PATENT DOCUMENTS

| CN | 202622796 U | 12/2012 |
| CN | 102954323 A | 3/2013 |
| CN | 202884405 U | 4/2013 |
| CN | 103604390 A | 2/2014 |
| CN | 103618473 A | 3/2014 |
| CN | 103644997 A | 3/2014 |
| CN | 103671374 A | 3/2014 |
| CN | 203476938 U | 3/2014 |
| CN | 104088871 A | 10/2014 |
| CN | 204061433 U | 12/2014 |

* cited by examiner

PRECISION-POSITIONING DRIVE PRE-TIGHTENING DEVICE

CROSS-REFERENCE TO RELATED APPLICATIONS

The present application is a U.S. National Stage entry under 35 U.S.C. § 371 of International Application No. PCT/CN2014/093090 filed on Dec. 5, 2014, designating the United States of America and published in Chinese on Dec. 30, 2015, which in turn claims priority to Chinese Application 201410301047.1 filed on Jun. 27, 2014, both of which are hereby incorporated by reference in their entirety.

TECHNICAL FIELD

The present invention relates to a pre-tightening device in the art such as a micro-nano operation, micro-nano measurement and micro-nano manufacture etc., and specifically relates to a precision-positioning drive end pre-tightening device.

BACKGROUND

A precision-positioning platform is a key part of the art such as a micro-nano operation, micro-nano measurement and micro-nano manufacture etc., and plays an important role in related fields of precision and ultra-precision machining, precision operation, precision measurement, micro-electro-mechanical system, etc. An actuator can be divided into a mechanical type and an electromechanical type, and the latter can be divided into a piezoelectric actuating type, a thermal actuation type, an electrostatic actuation type, an electromagnetic actuation type, a magnetostriction type and a voice coil motor etc. A piezoelectric ceramic actuator has a sub-nanometer resolution and a millisecond response, and a larger driving force, linear motion range and stiffness etc., can construct a closed loop control system of a drive end via a built-in SGS (Strain Gauge Sensor) so as to overcome a magnetic hysteresis property of the piezoelectric ceramic actuator, thereby realizing a relatively stable output of a high degree of accuracy, and is an ideal actuator for precision positioning.

Chinese patent CN 20031416314 A presses down a removable inclined wedge by means of twisting a set screw downwards so as to push a static inclined wedge to pre-tighten a piezoelectric ceramic actuator. Chinese patent CN 2012102619821 A presses down a removable inclined wedge by means of twisting a screw downwards so as to push a static inclined wedge to pre-tighten a piezoelectric ceramic actuator. Chinese patents 2012202884405 U and CN 2012102954323 A precisely push a vertically removable wedge block by means of twisting a micrometer caliper so as to push a laterally removable wedge block to pre-tightening piezoelectric ceramic actuator. Chinese patent CN 2013103671374 A pushes a driving wedge block to move by means of rotating a threaded adjustment rod so as to push a driven wedge block in contact with the driving wedge to move to realize the pre-tightening for a stacked piezoelectric ceramic actuator. A common problem of the above-mentioned wedge blocks or various improved pre-tightening methods based on the wedge blocks is that a pre-tightening displacement can not be detected, so as a pre-tightening precision and self-locking stability. In practical application, particularly, a high-frequency motion of an actuator during a long time may change in a the pre-tightening displacement so as to affect a practically input displacement value of a precision-positioning platform in the driving direction. In addition, inclined face contact is between a pair of wedge blocks, a pre-tightening force is transmitted via inclined faces, a processing manufacture accuracy is difficult to strictly ensure a plane accuracy, the location of the pre-tightening force can not be determined, and can not along the central axis of the actuator even lateral force and a bending moment will be produced when a line of action of an equivalent pre-tightening force is along a central axis of a driver.

Chinese patents CN 2013203476938 U and 2013103410817 A press a fixing block by means of a head part of a pressing screw gradually being close to a fixing block when the pressing screw rotates towards a quitting direction, reaction forces of the two tightly press the piezoelectric ceramic on a side wall of a groove of a machine body to realize a pre-tightening effect. Although the patents can avoid a lateral force, a torque produced during the rotating can not be eliminated, a change of the pre-tightening amount at a micro-nano level produced by any reason can not be measured or feedback compensated, and the pre-tightening accuracy and stability in practical application, especially under a high frequency motion of an actuator during a long time can not be ensured.

Contents of the Invention

The object of the present invention is overcoming defects and deficiencies in the above-mentioned prior art and providing a precision-positioning drive end pre-tightening device which satisfies the requirements of some precision-positioning applications which have a high demand of precision, accuracy, stability during a long time and a high-frequency displacement output procedure.

The present invention is achieved by the following technical solution:

A precision-positioning drive end pre-tightening device, which comprises a positioning platform 6, an actuator 14, a capacitive sensor 4, a capacitive sensor bracket 3, a pre-tightening block 12, a film force sensor 13;

a sliding groove is provided in the middle of said positioning platform 6, and said pre-tightening block 12, said film force sensor 13 and said actuator 14 are provided in the sliding groove in sequence;

said capacitive sensor bracket 3 is fixed on the positioning platform 6, a middle part of the capacitive sensor bracket 3 is opposite to the pre-tightening block 12; an axis of the capacitive sensor bracket 3 and the axial direction of the sliding groove are perpendicular to each other;

three connecting rods 3-1 which are connected in sequence via compliant hinges are axially provided at one end of the bracket body of said capacitive sensor bracket 3, and a middle connecting rod of the three connecting rods 3-1 is used for fixing the capacitive sensor 4; the capacitive sensor 4 is pre-tightened or fixed via a bolt 4-1 on the capacitive sensor bracket 3; an end surface of the capacitive sensor 4 and an upper side surface of the pre-tightening block 12 are parallel to each other, and a gap exists therebetween;

two micrometer calipers 5 which abut against the middle connecting rod of the three connecting rods 3-1 are provided in the middle part of the other side of a bracket body of said capacitive sensor bracket 3; an original gap and the depth of parallelism between the capacitive sensor 4 and the pre-tightening block 12 are changed by means of twisting scales of the two micrometer calipers 5;

and a two-stage pre-tightening device for pre-tightening the actuator 14 is also provided on said positioning platform 6.

said two-stage pre-tightening device comprises a first roller ball 11, a first-stage jack screw 10, a second roller ball 9, and a second-stage jack screw 8 which are located on the same axis of as the actuator 14 and the pre-tightening block 12 and are abutted against each other in sequence;

a contact part between said pre-tightening block 12 and said first roller ball 11 is face contact, and a contact part between the first-stage jack screw 10 and the first roller ball 11 is point contact;

and a contact part between said first-stage jack screw 10 and said second roller ball 9 is point contact.

A contact part between said pre-tightening block 12 and said first roller ball 11 is face contact, wherein said face contact is providing a hemispherical depression taper correspondingly to a circumferential surface of the first roller ball 11 on the pre-tightening block 12.

A contact part between said second-stage jack screw 8 and said second roller ball 9 is face contact, wherein said face contact is providing a hemispherical depression taper correspondingly to a circumferential surface of the second roller ball 9 on the second-stage jack screw 8.

A top part of said pre-tightening block 12 is provided with a reflective mirror bracket 2, and a reflective mirror 1 is provided on the reflective mirror bracket 2.

The present invention has the following advantages and effects as compared to the prior art:

1. Using a two-stage pre-tightening device to pre-tighten the actuator 14 (which refers to a piezoelectric ceramic actuator) to ensure that there is no a change at a sub-micrometer level and higher than the sub-micrometer level in the pre-tightening amount as a high frequency motion of the actuator for a long time, thereby improving the precision, the accuracy and the stability of the output displacement of the actuator 14;

2. The two-stage pre-tightening device respectively uses the first and the second roller balls (steel balls) to realize face contact (ball head contact) or point contact of the roller ball in a pre-tightening process, which is easy to determine a point of action and a point of direction of the pre-tightening force to ensure the pre-tightening precision and to avoid producing a lateral force and a bending moment during the pre-tightening process, and at the same time, the torque and the lateral force produced during the rotating of the jack screw (which refers to the first-stage jack screw 10 or the second-stage jack screw 8) can be eliminated to protect the actuator used for precision positioning such as the type of piezoelectric ceramic etc. which can bear a very limited torque;

3. The capacitive sensor 4 is used to read a movement displacement, i.e. a value of the pre-tightening amount, of the pre-tightening block 12 in real time, feeds same back to a control system (not shown in the figure), and supplements the change in the pre-tightening amount after the pre-tightening in real time, which ensures the stability of an input displacement of an input end of a corresponding mechanism. If the change in the pre-tightening amount exceeds the remaining of the actuator, an extending amount can be supplied, and the control system stops working and automatically gives an alarm;

4. Force input ends of the first-stage jack screw 10 and the second-stage jack screw 8 are respectively provided with a rectangular notch for a screwdriver to adjust, the pre-tightening amount is roughly adjusted via the screwdriver, the pre-tightening amount is precisely adjusted by using a pre-tightening amount precision adjustment rod handle with a special design (see FIG. 6 for the structure), which has the effects of being simple, being convenient, and being easy to carry out;

5. The amount of the pre-tightening force can be measured by using the film force sensor 13, at the same time, the value of the force output by the actuator 14 in the whole working process can also be measured and is fed back to the controller so as to calculate a dynamic stiffness of the actuator 14 and an input stiffness of the positioning platform 6 in the driving direction combining an output displacement of the actuator 14 and the input displacement of the positioning platform 6 in the direction;

6. The two micrometer calipers 5 (or fine thread screws) are used to push the middle connecting rod 3-1 on the other side of the bracket body of the sensor bracket 3 which is constituted by a compliant hinge so as to precise the distance between the initialized capacitive sensor 4 and the pre-tightening block 12 and to precisely adjust the depth of parallelism between the two, and a feeler gauge or a vernier caliper can be used to detect, which facilitates adjusting the measurement range of the capacitive sensor 4 and the measurement accuracy;

7. The reflective mirror 1 is mounted above the pre-tightening block 12, a double frequency laser interferometer is used (not shown in the figure) to measure the displacement of the pre-tightening block 12, to correct or calibrate the capacitive sensor 4, or to complete the monitoring of the pre-tightening amount independently to obtain a precise displacement value of the pre-tightening block 12, and at the same time, the effect of the rotation of the pre-tightening block 12 on the measurement accuracy of a linear movement of the capacitive sensor 4 can be measured or monitored;

8. The jack screws (which refer to the first-stage jack screw 10 and the secondary screw 8) use fine threads, and can also produce a jack screw with a smaller pitch by the jack screws with a higher set accuracy and a better stability;

9. The pre-tightening block 12, one roller ball and the first-stage jack screw can also be independently used to complete the pre-tightening without using all the assemblies at the same time, the other components provide an additional function and are independent to each other, therefore a corresponding assembly can be selected to use according to practical requirements, and the flexibility is high.

10. The first roller ball 11, the first-stage jack screw 10, the second roller ball 9 and the second-stage jack screw 8 abut against the pre-tightening block 12 in sequence, and satisfy the requirements in related fields of precision positioning, precision and ultra-precision machining, precision operating, precision measurement, micro-electro-mechanical system, etc. for the precision-positioning drive end pre-tightening device.

In summary, the technical means of the device is simple and easy, and has prominent substantive features and represents a notable progress with respect to the prior art.

PARTICULAR EMBODIMENTS

Figure 1:
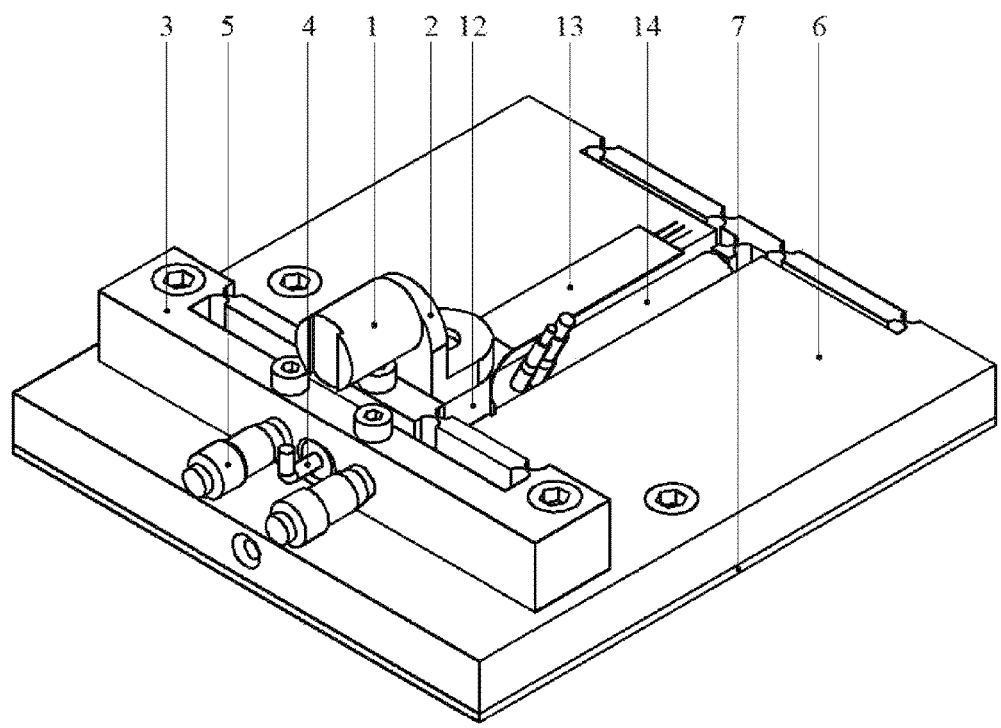
FIG. 1 is a structural schematic view of the appearance of the present invention.
Figure 2:
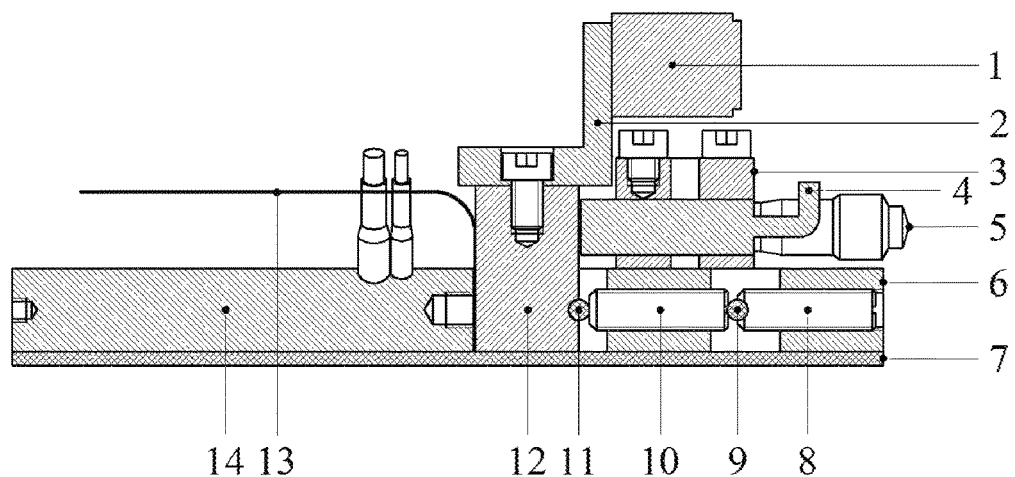
FIG. 2 is a structural schematic view of a longitudinal section of the present invention.
Figure 3:
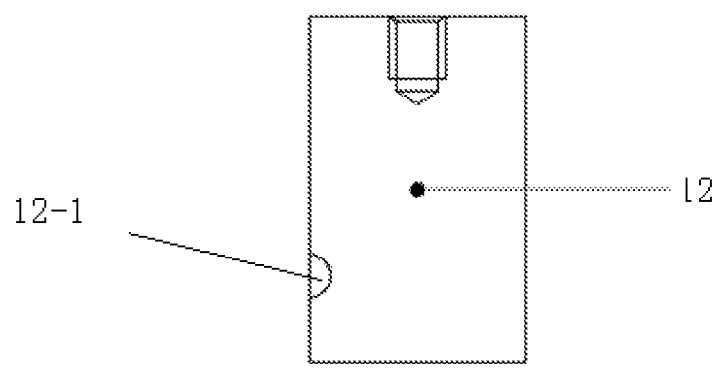
FIG. 3 is a structural schematic view of a pre-tightening block in FIG. 1.
Figure 4:
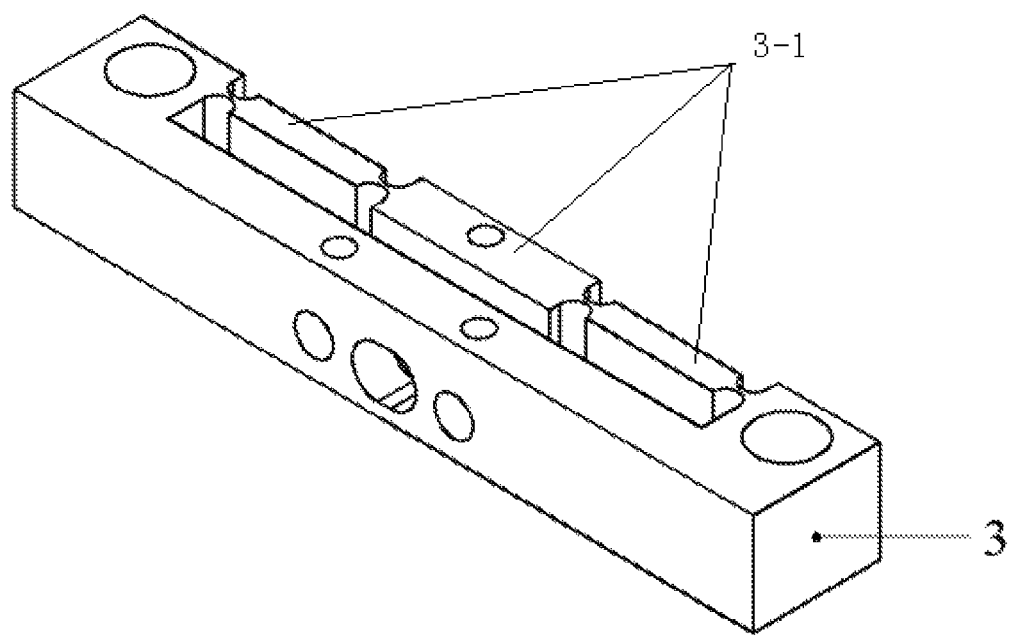
FIG. 4 is a structural schematic view of a capacitive sensor bracket in FIG. 1.
Figure 5:
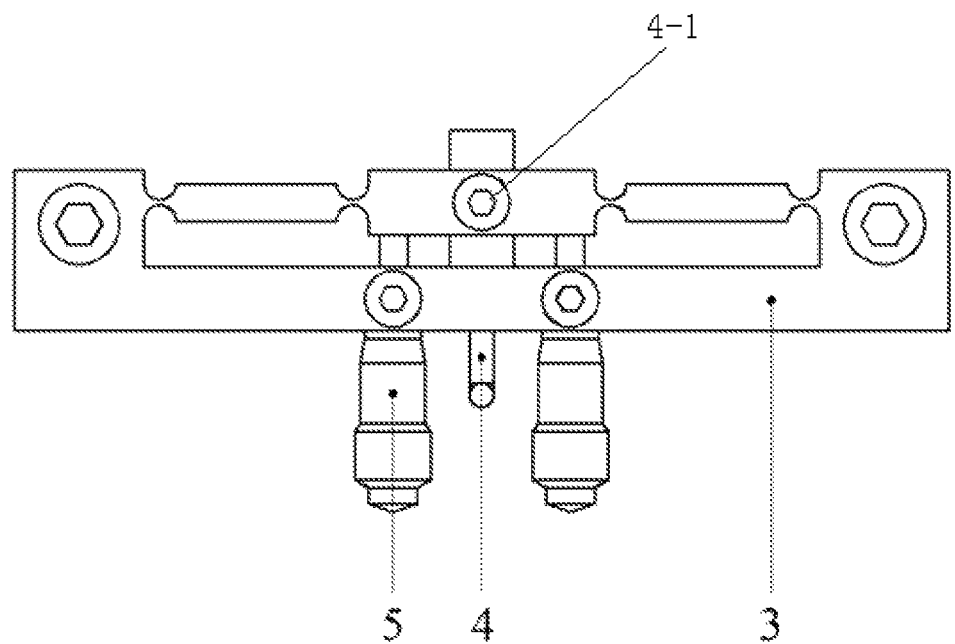
FIG. 5 is a schematic view of a combination of a capacitive sensor and a capacitive sensor bracket in FIG. 1.

The present invention is further specifically described in details in conjunction with particular embodiments below.

EXAMPLE

As shown in FIGS. 1-6. A precision-positioning drive end pre-tightening device of the present invention comprises a positioning platform 6, a actuator 14, a capacitive sensor 4, a capacitive sensor bracket 3, a pre-tightening block 12, a film force sensor 13;

a sliding groove is provided in the middle of said positioning platform 6, and said pre-tightening block 12, said film force sensor 13 and said actuator 14 are provided in the sliding groove in sequence; and a bottom part of the positioning platform 6 is provided with a gasket 7.

said capacitive sensor bracket 3 is fixed on the positioning platform 6, a middle part of the capacitive sensor bracket 3 is opposite to the pre-tightening block 12; an axis of the capacitive sensor bracket 3 and the axial direction of the sliding groove are perpendicular to each other;

three connecting rods 3-1 which are connected in sequence via compliant hinges are axially provided at one end of the bracket body of said capacitive sensor bracket 3, and a middle connecting rod of the three connecting rods 3-1 is used for fixing the capacitive sensor 4; the capacitive sensor 4 is pre-tightened or fixed via a bolt 4-1 on the capacitive sensor bracket 3; an end surface of the capacitive sensor 4 and an upper side surface of the pre-tightening block 12 are parallel to each other, and a gap exists therebetween; and at the same time, a side face of the pre-tightening block 12 needs to be smooth and clean.

two micrometer calipers 5 which abut against the middle connecting rod of the three connecting rods 3-1 are provided in the middle part of the other side of a bracket body of said capacitive sensor bracket 3; an original gap and the depth of parallelism between the capacitive sensor 4 and the pre-tightening block 12 is changed by means of twisting scales of the two micrometer calipers 5; and the compliant hinge of the capacitive sensor bracket 3 transmits the deformation, and the initial distance between the capacitive sensor 4 and the pre-tightening block 12 is adjusted and the depth of the parallelism of the two are precisely adjusted via the two micrometer calipers 5.

As described above, the film force sensor 13 is located between the pre-tightening block 12 and the actuator 14 and is used for reading the amount of the action force along a driving direction.

A two-stage pre-tightening device for pre-tightening the actuator 14 is also provided on said positioning platform 6.

said two-stage pre-tightening device comprises a first roller ball 11, a first-stage jack screw 10, a second roller ball 9, and a second-stage jack screw 8 which are located on the same axis of as the actuator 14 and the pre-tightening block 12 and are abutted against each other in sequence;

a contact part between said pre-tightening block 12 and said first roller ball 11 is face contact, and a contact part between the first-stage jack screw 10 and the first roller ball 11 is point contact;

and a contact part between said first-stage jack screw 10 and said second roller ball 9 is point contact.

A contact part between said pre-tightening block 12 and said first roller ball 11 is face contact, wherein said face contact is providing a hemispherical depression taper 12-2 correspondingly to a circumferential surface of the first roller ball 11 on the pre-tightening block 12.

A contact part between said second-stage jack screw 8 and said second roller ball 9 is face contact, wherein said face contact is providing a hemispherical depression taper correspondingly to a circumferential surface of the second roller ball 9 on the second-stage jack screw 8.

A top part of the pre-tightening block 12 is provided with a reflective mirror bracket 2, and a reflective mirror 1 is provided on the reflective mirror bracket 2. A movement displacement of the pre-tightening block 12 is measured via the reflective mirror 1. The precision common seen in the market such as the precision of a double-frequency laser interferometer XL-80 has a resolution of 1 nm, and can be used to monitor and feed back the change at a nanometer level of the pre-tightening amount.

When a screwdriver is used to twist the first-stage jack screw 10, the first-stage jack screw pushes the first roller ball 11 and the pre-tightening block 12 to move forwards, which is a rough adjustment procedure.

Figure 6:
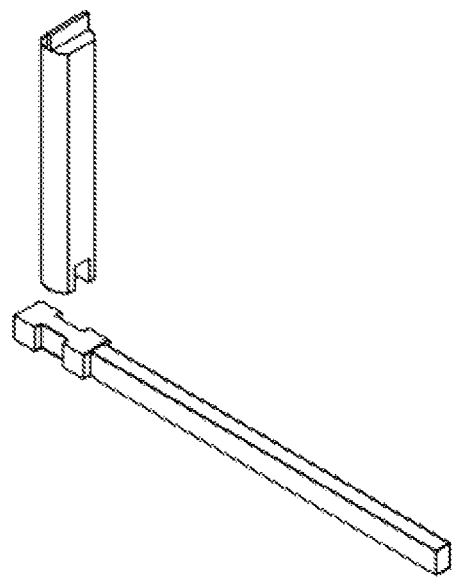
FIG. 6 is a structural schematic view of a pre-tightening amount precision adjustment handle with a special structure.

The movement displacement of the pre-tightening block 12, i.e. a pre-tightening amount, can be read in real time via the capacitive sensor 4 and the laser interferometer (not shown in the figure), and when the pre-tightening amount reaches a pre-set value, the pre-tightening amount precision adjustment handle with a special design as shown in FIG. 6 is used to replace the screwdriver to twist the first-stage jack screw 10, which is a precision adjustment procedure. The screwdriver is used to twist the second-stage jack screw 8 to push the second roller ball 9 to lock the first-stage jack screw 10.

The present invention can be better implemented as described above.

The embodiments of the present invention are not affected by the limitation of the above-mentioned examples, any change, modification, replacement, combination and simplification which does not depart from the spirit and principle of the present invention are all equivalent replacement manners and are all comprised in the scope of protection in the present invention.

The invention claimed is:

1. A precision-positioning drive end pre-tightening device, characterized in that the device comprises a positioning platform, an actuator, a capacitive sensor, a capacitive sensor bracket, a pre-tightening block, a film force sensor;

a sliding groove is provided in the middle of said positioning platform, and said pre-tightening block, said film force sensor and said actuator are provided in the sliding groove in sequence;

said capacitive sensor bracket is fixed on the positioning platform, a middle part of the capacitive sensor bracket is opposite to the pre-tightening block; an axis of the capacitive sensor bracket and the axial direction of the sliding groove are perpendicular to each other;

three connecting rods which are connected in sequence via flexure hinges are axially provided at one end of the bracket body of said capacitive sensor bracket, and a middle connecting rod of the three connecting rods is used for fixing the capacitive sensor; the capacitive sensor is pre-tightened or fixed via a bolt on the capacitive sensor bracket; an end surface of the capacitive sensor and an upper side surface of the pre-tightening block are parallel to each other, and a gap exists therebetween;

two micrometer calipers which abut against the middle connecting rod of the three connecting rods are provided in the middle part of the other side of a bracket body of said capacitive sensor bracket; an original gap and the depth of parallelism between the capacitive sensor and the pre-tightening block are changed by means of twisting scales of the two micrometer calipers;

and a two-stage pre-tightening device for pre-tightening the actuator is also provided on said positioning platform.

2. The precision-positioning drive end pre-tightening device according to claim 1, characterized in that said two-stage pre-tightening device comprises a first roller ball, a first-stage jack screw, a second roller ball, and a second-stage jack screw which are located on the same axis of as the actuator and are abutted against each other in sequence;

a contact part between said pre-tightening block and said first roller ball is face contact, and a contact part between the first-stage jack screw and the first roller ball is point contact;

and a contact part between said first-stage jack screw and said second roller ball is point contact.

3. The precision-positioning drive end pre-tightening device according to claim 2, characterized in that a contact part between said pre-tightening block and said first roller ball is face contact, wherein said face contact is providing a hemispherical depression taper correspondingly to a circumferential surface of the first roller ball on the pre-tightening block.

4. The precision-positioning drive end pre-tightening device according to claim 2, characterized in that a contact part between said second-stage jack screw and said second roller ball is face contact, wherein said face contact is providing a hemispherical depression taper correspondingly to a circumferential surface of the second roller ball on the second-stage jack screw.

5. The precision-positioning drive end pre-tightening device according to claim 2, characterized in that a top part of the pre-tightening block is provided with a reflective mirror bracket, and a reflective mirror is provided on the reflective mirror bracket.

* * * * *